United States Patent [19]

Strange et al.

[11] 3,873,518

[45] Mar. 25, 1975

[54] WATER SOLUBLE TERNARY CELLULOSE ETHERS

[75] Inventors: Carl P. Strange, Walker; Robert T. Sylvest; Joseph G. Schell, Jr., both of Baton Rouge, all of La.

[73] Assignee: The Dow Chemical Company, Midland, Mich.

[22] Filed: Dec. 14, 1973

[21] Appl. No.: 425,041

[52] U.S. Cl.......... 260/231 A, 106/170, 106/197 R, 117/161 C, 260/17 A, 260/29.2 UA
[51] Int. Cl............................................. C08b 11/00
[58] Field of Search ...... 260/231 A, 17 A; 106/170, 106/197 R

[56] References Cited
UNITED STATES PATENTS

| | | | |
|---|---|---|---|
| 2,469,764 | 5/1949 | Erickson | 260/231 R |
| 2,572,039 | 10/1951 | Klug et al. | 260/231 A |
| 2,839,419 | 6/1958 | Windover et al. | 260/231 A |
| 2,949,452 | 8/1960 | Savage | 260/231 A |
| 3,296,247 | 1/1967 | Klug | 260/231 A |
| 3,347,847 | 10/1967 | Engelskirchen et al. | 260/232 |
| 3,388,082 | 6/1968 | Rodgers et al. | 260/17 R |
| 3,493,407 | 2/1970 | Greminger et al. | 264/301 |
| 3,549,566 | 12/1970 | Mesirov | 260/17 R |
| 3,749,710 | 7/1973 | Koyanagi et al. | 260/231 A |
| 3,769,247 | 10/1973 | Glomski et al. | 106/170 |

*Primary Examiner*—Ronald W. Griffin
*Attorney, Agent, or Firm*—David B. Kellom

[57] ABSTRACT

Novel water soluble ternary cellulose ethers are prepared by reacting alkali cellulose with methyl chloride, propylene oxide, and ethylene oxide to give a hydroxyethyl hydroxypropyl methyl cellulose having a total degree of substitution greater than about 1.5 and a controlled gel point above 70°C. Because of excellent pigment color compatibility and enzyme resistance, these ternary cellulose ethers are particularly desirable as latex paint thickeners. Also their organic solubility makes these ethers useful in well-treating formulations.

20 Claims, No Drawings

WATER SOLUBLE TERNARY CELLULOSE ETHERS

BACKGROUND

Water soluble cellulose ethers have long been employed in aqueous coating compositions as thickeners and protective colloids. Latex paints thickened with hydroxyethyl cellulose products have good flow, brush out and color development. By good color development is meant the ability of a coating composition to retain a pigment dispersion without significant loss of pigment effectiveness through agglomeration or flocculation. It is visually evident in the color uniformity of a coating applied with varying amount of shear. However, these products have low resistance to bacterial degradation, cf. Lindenfors, Acta Chemica Scand., 16, 1111 (1962).

Rogers, Wakeman, and Savage, U.S. Pat. No. 3,388,082 describes methyl cellulose ethers with a high hydroxypropyl substitution which are suitable thickeners with increased enzymatic resistance. Yet with some organic pigments now replacing banned lead colors, good color development and compatibility cannot be achieved with these hydroxypropyl ethers.

Glomski, Davis & Grover U.S. Pat. No. 3,709,876 describe certain hydroxyethyl methyl cellulose ethers which have superior color compatibility and enzyme resistance combined with a thermal gel point greater than about 100°C. However, the high gel point necessitates use of modified purification techniques. The solubility of these ethers in hot water prohibits the usual process of washing with hot water to remove byproduct salts and other watersoluble impurities.

STATEMENT OF THE INVENTION

By combining hydroxyethyl, hydroxypropyl and methyl substituents in a novel way, new ternary cellulose ethers can be prepared combining excellent color compatibility and enzyme resistance with a controlled thermal gel point ranging from about 70° to 90°C. Furthermore, these tertiary ethers have a surprising solubility in organic solvents including absolute methanol. More specifically, these cellulose ethers have a methoxyl substitution of about 6–12.5 wt. %, a hydroxypropyl substitution of about 14–32 wt. %, a hydroxyethoxyl substitution of about 10–22 wt. %, and a total degree of substitution greater than about 1.5.

To achieve the required ternary substitution, a controlled reaction of alkali cellulose with methyl chloride, propylene oxide and ethylene oxide is required. Preferably alkali cellulose prepared by treating finely divided cellulose with about 0.35–0.75 parts of NaOH as a 35–70% aqueous solution is blended with about 0.75–2.0 parts of propylene oxide and about 0.4–1.5 parts of methyl chloride at a temperature below about 40°C. Then the resulting slurry is heated at about 40°–60°C while about 0.5–1.5 parts of ethylene oxide are added gradually. To complete the reaction, the mixture is further heated at about 50°–80°C and then the hydroxyethyl hydroxypropyl methyl cellulose product is recovered.

These new ternary cellulose ethers provide a combination of properties not previously available in a single cellulose ether product. Since these properties overcome recognized deficiencies of current products, they offer improved performance in many established markets for methyl cellulose products and new opportunities in other use areas.

GENERAL DESCRIPTION

A. Ternary Cellulose Ethers - HEHPMC

Prior studies on the effect of cellulose ether substituents on properties of particular interest to the paint industry have shown that hydroxyethyl substitution generally increases the gel point and color compatibility, hydroxypropyl substitution reduces the gel point but increases color development and methyl substitution decreases both gel point and color compatibility. Also a higher total degree of substitution generally increases the enzyme resistance. Yet ternary derivatives have not been reported.

By combining certain levels of hydroxyethyl, hydroxypropyl, and methyl substitution, ternary ethers are obtained with a highly useful combination of properties including the surprising solubility in absolute methanol. Thus, the new ternary cellulose ethers are soluble in water and absolute methanol at room temperature at concentrations of 5 wt. % or more. These products are further characterized by the following properties:

| | |
|---|---|
| Wt. % Methoxyl | 6–12.5%, preferably about 6.5–11.0% |
| Wt. % Hydroxypropyl | 14–32%, preferably about 14.5–27.5% |
| Wt. % Hydroxyethoxyl | 10–22%, preferably about 15.0–22.0% |
| Total DS | >1.5, preferably about 1.7–2.7 |
| Gel Point | >about 70°C, preferably about 70–90°C |

In general, a high hydroxyethyl content favors color compatibility, a high hydroxypropyl content gives desired gel point control, a low methoxyl content improves methanol solubility, and a high total degree of substitution improves enzyme resistance.

Total degree of substitution (total DS) refers to the average number of cellulosic hydroxyl groups etherified per anhydroglucose unit. The related term "molar substitution" (MS) is also used in a conventional manner. The maximum possible total DS is 3.0.

Lindenfors (op. cit.) contends that cellulose derivatives are not susceptible to enzymatic attack if there is at least one firmly bound substituent per anhydroglucose unit. Even in a sterile medium, enzymes attack cellulose at points adjacent to unsubstituted anhydroglucose units to form sugars. The fact that products with a total DS greater than 1.0 are degraded enzymatically is indicative of the nonuniform substitution of the products. Also a higher total DS is required for a product prepared from more crystalline cotton linters than from wood cellulose.

Note that the thermal gel point is also a critical factor. Ternary ethers with a gel point below about 70°C have poor color compatibility and methanol solubility. Products with a thermal gel point below about 90°C can be readily purified by washing with hot water. Alternative methods, such as described in Engelskirchen e.a. U.S. Pat. No. 3,347,847, are required for products with higher gel points. For applications where residual salt can be tolerated, a crude ternary ether can be used without extensive purification.

B. Etherification Process

The ternary cellulose ethers are prepared by reacting methyl chloride, propylene oxide, and ethylene oxide with alkali cellulose in a pressure reactor in the absence of air at about 40°–60°C. Table 1 gives the operable and preferred reactant ratios:

Table 1

| Reactant | Reactant Ratios Parts/Part Cellulose | | Mole/Mole Cellulose | |
|---|---|---|---|---|
| NaOH | 0.35–0.75 | (0.45–0.55) | 1.4–3.0 | (1.8–2.2) |
| Methyl chloride | 0.4–1.5 | (0.8–1.2) | 1.3–4.8 | (2.5–3.8) |
| Propylene oxide | 0.75–2.0 | (1.0–1.75) | 2.0–5.5 | (2.7–4.6) |
| Ethylene oxide | 0.5–1.7 | (0.9–1.5) | 1.8–6.1 | (3.2–5.4) |

Alkali cellulose for the process is prepared by treating cellulose with about 0.35–0.75 parts NaOH/part cellulose (1.4–3.0 moles/mole) added as 35–70% aqueous NaOH at about room temperature. A dip tank as described in Savage U.S. Pat. No. 2,949,452, a spray mixer as described by Erickson U.S. Pat. No. 2,469,764, or a slurry reactor as described by Haskins, e.g., U.S. Pat. No. 2,131,733 are suitable. Contact with air is minimized to reduce viscosity loss.

The reaction is carried out in a pressure reactor in the absence of air. Careful temperature control is essential for uniform substitution. External cooling is normally required. Also excess methyl chloride can be used as a heat transfer and ebullient cooling agent. Other ebullient diluents, such as dimethyl ether or a water soluble organic liquid such as isopropanol or tertiary butanol, can be used to moderate the exothermic reactions.

Because of the greater reactivity of the ethylene oxide, the reactor is generally charged with the major proportion of the methyl chloride and propylene oxide at room temperature and heated to about 40°–50°C. before beginning the ethylene oxide addition at a rate sufficient to maintain the desired temperature, usually about 45°–60°C. However, incremental additions of methyl chloride and propylene oxide can also be used.

When the exothermic hydroxyethylation is completed, the reaction can be finished at about 55°–80°C. The overall reaction time may be 4–12 hours. Then the reactor is vented and the product purified by appropriate means.

Products with a thermal gel point below about 90°C can be effectively washed with a limited amount of hot water. The product remains insoluble in the hot brine. Products with a higher gel point can be processed with an organic solvent. After washing, the product may be dried and then optionally granulated, milled, surface treated, or otherwise prepared for the desired end use.

C. Properties & Utility

The new water and organic soluble hydroxyethyl hydroxypropyl methyl cellulose ethers exhibit many of the properties of other water soluble methyl cellulose ethers. They are readily prepared in a wide range of viscosities. For use as a latex paint thickener, a 2% aqueous solution viscosity at 20°C of about 400–100,000 cps. and preferably about 4,000–50,000 cps. is most useful. For other applications, products with viscosities lower than 400 cps. can be prepared as desired.

These cellulose ethers are particularly useful in aqueous latex coating compositions as thickeners and protective colloids for the dispersion of finely divided water insoluble polymer particles. Examples of such polymeric materials are copolymers of monoethylenically unsaturated compounds such as styrene and acrylonitrile with a conjugated diolefin such as butadiene; homo- and copolymers of styrene, acrylic and methacrylic esters; vinyl halide and vinylidene halide monomers; and homopolymers and copolymers of vinyl acetate. They can also be used with a carboxylic polymer latex such as described in Mersirov U.S. Pat. No. 3,549,566.

Usually these latex coating compositions contain added pigment fillers and extenders such as titanium dioxide, barium sulfate, clays, mica, talc, silica, and the like. Particularly with colored pigments and dyes, the new hydroxyethyl hydroxypropyl methyl cellulose ethers provide superior color development and enzyme resistance as well as good film and application properties. Effective results are obtained using about 0.2–1.0 wt. % HEHPMC based on total weight of the formulated paint.

The following examples illustrate further the present invention. Unless indicated, all parts and percentages are by weight. The cellulose ether analyses are by conventional methods as described in ASTM D-1346-64 and D-2363-69. The alkyl ether substitutions are determined by the modified Zeisel method described by Cobler, Samsel & Beaver, *Tantala*, 9, 473 (1962) with hydriodic acid hydrolysis and gas liquid chromatographic analysis of the resulting mixed alkyl iodides. Gel points are determined using 1% aqueous solutions heated with stirring until visual phase separation.

Example 1: Typical Preparation of HEHPMC

A. A 7 ft$^3$ (196 l.) stirred pressure reactor was charged with 20 lbs. (9.1 kg.) of ground cellulose flock and the air displaced several times with nitrogen. The reactor was evacuated and 20 lbs. (9.1 kg.) of 50% NaOH was sprayed onto the vigorously agitated cellulose. Then 20 lbs. (9.1 kg.) of methyl chloride and 30 lbs. (13.6 kg.) of propylene oxide were added. The mixture was heated to 50°C in about 50 minutes and then 22 lbs. (10.0 kg.) of ethylene oxide was added intermittently over 95 minutes while holding the reaction temperature at 45°–50°C. The reaction was finished by heating at 55°C for another 3.5 hours. The reactor was cooled, vented and the crude HEHPMC product recovered. It was purified by washing with hot water, dried at 80°–120°C, and ground to a fine powder in a ball mill.

The product, HEHPMC-1, had 9.9 wt. % methoxyl, 25.6 wt. % hydroxypropoxyl, and 21.2 wt. % hydroxyethoxyl substitution, a thermal gel point of 89°C, and a 2% aqueous solution viscosity of about 28,000 cps at 20°C. Five parts dissolved completely in 100 parts anhydrous methanol at room temperature to give a clear viscous solution. It had excellent enzyme resistance and color compatibility in standard evaluation tests as shown below.

B. Table 2 gives composition and property data for other typical HEHPMC products prepared by the general process described above. In these runs the following general and preferred reactant weight ratios were established:

| | |
|---|---|
| NaOH/Cellulose | 0.35–0.75, preferably about 0.45–0.55 |
| MeCl/Cellulose | 0.4–1.5, preferably about 0.8–1.2 |
| PO/Cellulose | 0.75–2.0, preferably about 1.0–1.75 |
| EO/Cellulose | 0.5–1.7, preferably about 0.9–1.5 |

Also the ethylene oxide addition was carried out at 45°–60°C. However, careful temperature control, particularly during the exothermic ethylene oxide reaction, was important for uniformity of substitution and product quality.

Except for HEHPMC-1, the products are listed in Table 2 in increasing order of methoxyl substitution. The overall rating is a qualitative evaluation based primarily on methanol solubility and paint stability properties of critical importance in several major applications of these products. However, for other uses of these products, other properties may be of greater importance.

Table 2

Typical HEHPMC Products

| No. | Composition, Wt. % MeO | HPO | HEO | Gel Pt. °C | Properties[1-3] MeOH Sol. | Color Dev. | Enz. Loss | Overall Rating |
|---|---|---|---|---|---|---|---|---|
| 1 | 9.9 | 25.6 | 21.2 | 89° | H | 2 | 39% | Exc. |
| 2 | 6.6 | 32.0 | 19.4 | 70° | H | 2 | — | Good |
| 3 | 7.0 | 21.6 | 18.0 | 87° | H | 1 | 14% | Exc. |
| 4 | 7.8 | 29.0 | 15.6 | 66° | N | 5 | — | Poor |
| 5 | 8.4 | 22.8 | 18.6 | 84° | H | 2 | 65 | Good |
| 6 | 9.7 | 23.2 | 16.9 | 78° | H | 4 | 26% | Good |
| 7 | 10.1 | 23.2 | 15.4 | 70° | M | 3 | — | Poor |
| 8 | 10.9 | 14.7 | 21.8 | 83° | L | 3 | 32% | Fair |
| 9 | 11.0 | 15.9 | 15.6 | 85° | H | 4 | 55% | Fair |
| 10 | 11.9 | 17.9 | 12.9 | 78° | N | 5 | — | Poor |
| 11 | 12.3 | 27.3 | 10.8 | 72° | H | 5 | 47% | Fair |
| 12 | 14.3 | 12.1 | 13.4 | 70° | N | 3 | 91% | Poor |
| 13 | 16.7 | 22.5 | 4.3 | 47° | M | 7 | 77% | Poor |
| 14 | 17.5 | 14.5 | 11.7 | 70° | N | 4 | 70% | Poor |

[1]Methanol Solubility — 1 part in 20 parts absolute MeOH at room temperature
H — High; clear, viscous solution
M — Moderate; cloudy, viscous solution
L — Low; fair dispersion, visible swelling
N — Nil; poor dispersion.
[2]Color development and Enzyme Loss — see Examples 2–4
[3]Overall Rating Scale: Poor — Fair — Good — Excellent A major use of the new HEHPMC products is as a thickener for latex paints. This has been demonstrated with standard latex paint formulations and tests.

A. Formulations

Stock 3% aqueous solutions of the HEHPMC products were prepared and used as the thickener in the following typical exterior and interior latex paint formulations.

Formulation 1 — Exterior Acrylic Latex Paint Base

| Ingredients | Lbs./100 gal. |
|---|---|
| Water | 124.9 |
| Pigment dispersant (Daxad 30) | 8.0 |
| Potassium tripolyphosphate | 2.0 |
| Defoamer (Polyglycol P-1200) | 8.0 |
| Preservative (Dowicil 100) | 2.0 |
| Titanium dioxide, (Ti Pure R-901) | 200.0 |
| Calcium carbonate (Atomite) | 257.0 |
| Surfactant (Triton X-100) | 5.0 |
| Ethylene glycol | 15.0 |
| Acrylic latex (Rhoplex AC 34) | 387.0 |
| 3% Thickener solution | 167.0 |
| Total | 1,175.9 |

Formulation 2 — Interior Polyvinyl Acetate Latex Paint Base

| Ingredients | Lbs./100 gal. |
|---|---|
| Water | 300.0 |
| Pigment dispersant (Daxad 30) | 6.0 |
| Potassium tripolyphosphate | 0.5 |
| Surfactant (Igepal CO-630) | 4.0 |
| Preservative (Dowicil 75) | 1.6 |
| Ethylene glycol | 25.0 |
| Titanium dioxide (Ti-Pure R-901) | 250.0 |
| Calcium carbonate (Snowflake White) | 100.0 |
| Clay filler (ASP-400) | 125.0 |
| Coalescent (Texanol) | 16.0 |
| Polyvinyl Acetate Latex (Everflex E) | 250.0 |
| Defoamer (Nopco NDW) | 2.0 |
| 3% Thickener solution | 167.0 |
| Total | 1247.1 |

B. Evaluation Tests
 1. Color Development

To 229 parts of the latex paint base was added 31 parts of a 2% aqueous solution of the test HEHPMC. After thorough mixing with a paddle stirrer for 30 minutes, five 50 part samples were taken and heated at 50°C for 2 hours. To simulate tinting of paint hot from a grinding mill, 1 part of test colorant was added to each preheated sample of the thickened base paint with gentle mixing for 1 minute. Then a 7–10 mil drawdown was made on a Penopac Form 1-B chart with a doctoring bar. After 1 minute, the paint was sheared with a fingertip at the intersection of the sealed and unsealed portions of the chart. The color difference between the sheared and unsheared areas was evaluated against standards rated 1 for perfect color compatibility to 10 for severe incompatibility.

2. Enzyme Resistance Test

To evaluate enzyme resistance, the accelerated test described in Glomski e.a. U.S. Pat. No. 3,709,876 was followed using 1% aqueous solutions of the cellulose ethers innoculated with a 1% aqueous solution of a standard cellulose enzyme (Cellase 1000 from Wallerstein Company, Morton Grove, Ill.) at pH 7.0 and 25°C. The enzyme resistance was measured by the aqueous solution viscosity loss using a Brabender Visco/Amylograph or a Haake Rotovisco Meter (Gebroder Haake K. G., West Berlin, Germany). Correlation between the two test methods was good.

3. Thickening Efficiency

The paint viscosity was measured 24 hours after preparation. A viscosity of about 85–100 Kreb Units is normally desired with about 3–5 lbs. HEHPMC/100 gal. of paint, i.e., about 0.2–0.4 wt. percent HEHPMC based on formulated paint. 100 Ku is considered an "ideal" brushing viscosity.

4. Flow and Leveling

"Brush outs" are prepared using 20 g. of latex paint applied to a 2 ft² surface. The effect of the thickener on flow and leveling is measured compared to standard brush outs using a rating scale of 1 - best to 10 - poorest.

Example 2: HEHPMC in Exterior Acrylic Latex Paint

A. A sample of HEHPMC-1 was evaluated in the above exterior acrylic latex paint formulation using for comparison commercial hydroxypropylmethyl cellulose (HPMC - Methocel J 12 HS from The Dow Chemical Company) commercial hydroxyethyl cellulose (HEC - Natrosol 250 HR from Hercules, Inc.), and a developmental hydroxyethylmethyl cellulose (HEMC - XD 8186 from The Dow Chemical Company). Note that the HEHPMC thickened paints give superior color development compared with HPMC and improved enzyme stability compared with HEC, properties generally similar to the HEMC products of Glomski e.a. U.S. Pat. No. 3,709,876.

Table 3

HEHPMC in Acrylic Latex Paint

| Evaluation Test[1] | HEHPMC-1 | HPMC | HEMC | HEC |
|---|---|---|---|---|
| Color Development[2] | | | | |
| Aquablak "G" | 3 | 10 | 2–3 | 2 |
| Monastral Red "B" | 3 | 9 | 2 | 2 |
| Violet "J" | 4 | 8 | 4 | 4 |
| Enzyme Loss | 39% | 66% | 15% | 88% |
| Thickening Efficiency | 103 KU | 99 KU | 119 KU | 114 KU |
| Flow & Leveling | 6 | 7 | 7 | 7 |
| Film Build | Good | Moderate | Moderate | Moderate |
| Scrub Cycles | >800 | >800 | >800 | >800 |

[1]5 lbs. thickener/100 gal. formulated latex paint
[2]A wide variety of colorants have been tested. Aquablak "G" (Cities Service), Monastral Red "B" (duPont), and Violet "J" (PPG Industries) are particularly demanding colorants chosen to emphasize color development problems in using these cellulose ether thickeners.

B. The color development data in Table 2 were obtained using the exterior acrylic latex formulation and Aquablak "M" colorant (Cities Service).

Example 3: HEHPMC in Interior Polyvinyl Acetate Paint

A sample of HEHPMC-3 was evaluated in the interior polyvinyl acetate latex paint formulation given above using a commercial hydroxypropylmethyl cellulose (HPMC - Methocel J12HS from The Dow Chemical Company) and hydroxyethyl cellulose (HEC - Natrosol 250 HR from Hercules, Inc.) for comparison. Typical results are given in Table 4.

TABLE 4

| | HEHPMC in Polyvinyl Acetate Paint | | |
|---|---|---|---|
| Evaluation Test[1] | HEHPMC-3 | HPMC | HEC |
| Color Development | | | |
| Aquablak "G" | 3 | 10 | 2 |
| Monastral Red "B" | 3 | 10 | 2 |
| Violet "J" | 5 | 8 | 4 |
| Enzyme Loss | 14% | 66% | 88% |
| Thickening Efficiency | 74 KU | 84 KU | 96 KU |
| Flow & Leveling | 5 | 5 | 5 |
| Film Build | Moderate | Moderate | Moderate |
| Scrub Cycles | >400 | >400 | >400 |

[1]At 5 lbs./100 gal.

Example 4: HEHPMC Enzyme Resistance

Typical results from the modified Lindenfors enzyme stability test described in Glomski e.a. U.S. Pat. No. 3,709,876 are given in Tables 2–5.

Example 5: Comparison with Other Cellulose Ethers

Table 5 summarizes typical composition and property data for the preferred HEHPMC compositions based on combination of organic solubility, good color compatibility and high enzyme resistance, properties of major importance in the use of these products as a thickener for latex paint. For comparison, similar data are given for several commercial cellulose ether products that have been used in this application.

The HEHPMC products are also useful in many other

Table 5

Comparison with Other Cellulose Ethers

| Product[1] | Composition, Wt. % | | | Gel Pt. °C | MeOH Sol | Color Dev. | Enz. Loss |
|---|---|---|---|---|---|---|---|
| | McO | HPO | HEO | | | | |
| MC | 27.5–31.5 | 0 | 0 | ~45° | No | Poor | >90% |
| HPMC-65 | 27.0–29.0 | 4.0–7.5 | 0 | ~65° | No | Poor | ~80% |
| HPMC-90 | 24.0–26.0 | 4.0–12.0 | 0 | ~85–90° | No | Fair | 75–85% |
| HPMC-J | 16.5–20.0 | 23.0–32.0 | 0 | ~75° | No | Fair | 65% |
| HEC | 0 | 0 | 29.0–40.0 | >100° | No | Exc. | ~85% |
| HEHPMC[2] | 6.5–11.0 | 14.5–27.5 | 15.0–22.0 | ~70–90° | Yes | Good-Exc. | <50% |

[1] MC — Methocel MC (Dow Chemical Co.)
HPMC-65 — Methocel 65 HG (Dow Chemical Co.)
HPMC-90 — Methocel 90 HG (Dow Chemical Co.)
HPMC-J — Methocel J (Dow Chemical Co.)
HEC — Natrosol 250 HR (Hercules, Inc.)
[2] Preferred composition for latex paint areas as thickeners, protective colloids, soluble films, binders, etc. For example, the improved organic solubility of these ternary ethers is of significant value in thickening hydraulic fracturing fluids such as described in Pence U.S. Pat. No. 3,765,488. Thus, they offer improved performance in many established uses for methyl cellulose plus new opportunities in other areas.

We claim:

1. A water soluble hydroxyethyl hydroxypropyl methyl cellulose having a total degree of substitution greater than about 1.5, a methoxyl content of about 6–12.5 wt. %, a hydroxypropoxyl content of about 14–32 wt. %, a hydroxyethoxyl content of about 10–22 wt. %, and a thermal gel point greater than about 70°C.

2. The ternary cellulose ether of claim 1 where the methoxyl substitution is about 6.5–11.0 wt. %.

3. The ternary cellulose ether of claim 1 where the hydroxypropoxyl substitution is about 14.5–27.5 wt. %.

4. The ternary cellulose ether of claim 1 where the hydroxyethoxyl substitution is about 15.0–22.0 wt. %.

5. The ternary cellulose ether of claim 1 having a thermal gel point of about 70°–90°C and a methanol solubility of at least 5 wt. % at room temperature.

6. The ternary cellulose ether of claim 1 having a 2% aqueous solution viscosity of about 400–100,000 cps at 20°C.

7. A process for preparing the water soluble ternary cellulose ether of claim 1 comprising:
   A. preparing an alkali cellulose by treating cellulose with about 0.35–0.75 parts NaOH/part cellulose using 35–70% aqueous NaOH;
   B. Blending the alkali cellulose in the absence of air with about 0.4–1.5 parts methyl chloride and about 0.75–2.0 parts propylene oxide per part cellulose and heating to about 40°–50°C;
   C. adding about 0.5–1.7 parts ethylene oxide per part cellulose over about 2–4 hours while maintaining a temperature of about 40°–60°C; and thereafter
   D. Recovering a solid ternary cellulose ether having a thermal gel point greater than about 70°C.

8. The process of claim 7 where the ethylene oxide is added incrementally at a temperature of about 45°–60°C.

9. The process of claim 7 where after the ethylene oxide addition is completed, the reaction mixture is heated at about 55°–80°C to complete the etherification.

10. The process of claim 7 where the recovered cellulose ether has a 2% aqueous solution viscosity of about 400–100,000 cps at 20°C.

11. An aqueous coating composition comprising an aqueous latex dispersion of finely divided, water insoluble polymer particles prepared from ethylenically unsaturated monomers, a pigment, and about 0.2–1.0 wt. % based on total solids weight of the coating composition of the water soluble ternary cellulose ether of claim 1.

12. The aqueous coating composition of claim 11 where the methoxyl substitution of the ether is about 6.5–11.0 wt. %.

13. The aqueous coating composition of claim 11 where the hydroxypropoxyl substitution of the ether is about 14.5–27.5 wt. %.

14. The aqueous coating composition of claim 11 where the hydroxyethyl substitution of the ether is about 15.0–22.0 wt. %.

15. The aqueous coating composition of claim 11 where the total degree of substitution of the ether is about 1.7–2.7 and its thermal gel point about 70°–90°C.

16. The aqueous coating composition of claim 11 where the ternary cellulose ether has a methoxyl content of about 6.5–11.0 wt. %, a hydroxypropoxyl content of about 14.5–27.5 wt. %, a hydroxyethoxyl content of about 15.0–22.0 wt. %, and a thermal gel point of about 70°–90°C.

17. The aqueous coating composition of claim 15 where the ternary cellulose ether has a 2% aqueous solution viscosity of about 4,000–50,000 cps at 20°C.

18. The aqueous coating composition of claim 11 where the aqueous latex dispersion is a styrene-butadiene latex.

19. The aqueous coating composition of claim 11 where the aqueous latex dispersion is a polyvinyl acetate latex.

20. The aqueous coating composition of claim 11 where the aqueous latex dispersion is a polyacrylate latex.

* * * * *